Oct. 17, 1961   I. H. CULVER ET AL   3,004,736
TAIL ROTOR FOR HELICOPTER
Filed Oct. 6, 1959   2 Sheets-Sheet 1

INVENTORS
IRVEN H. CULVER
DONALD E. WALTERS
BY
George A. Sullivan
Agent

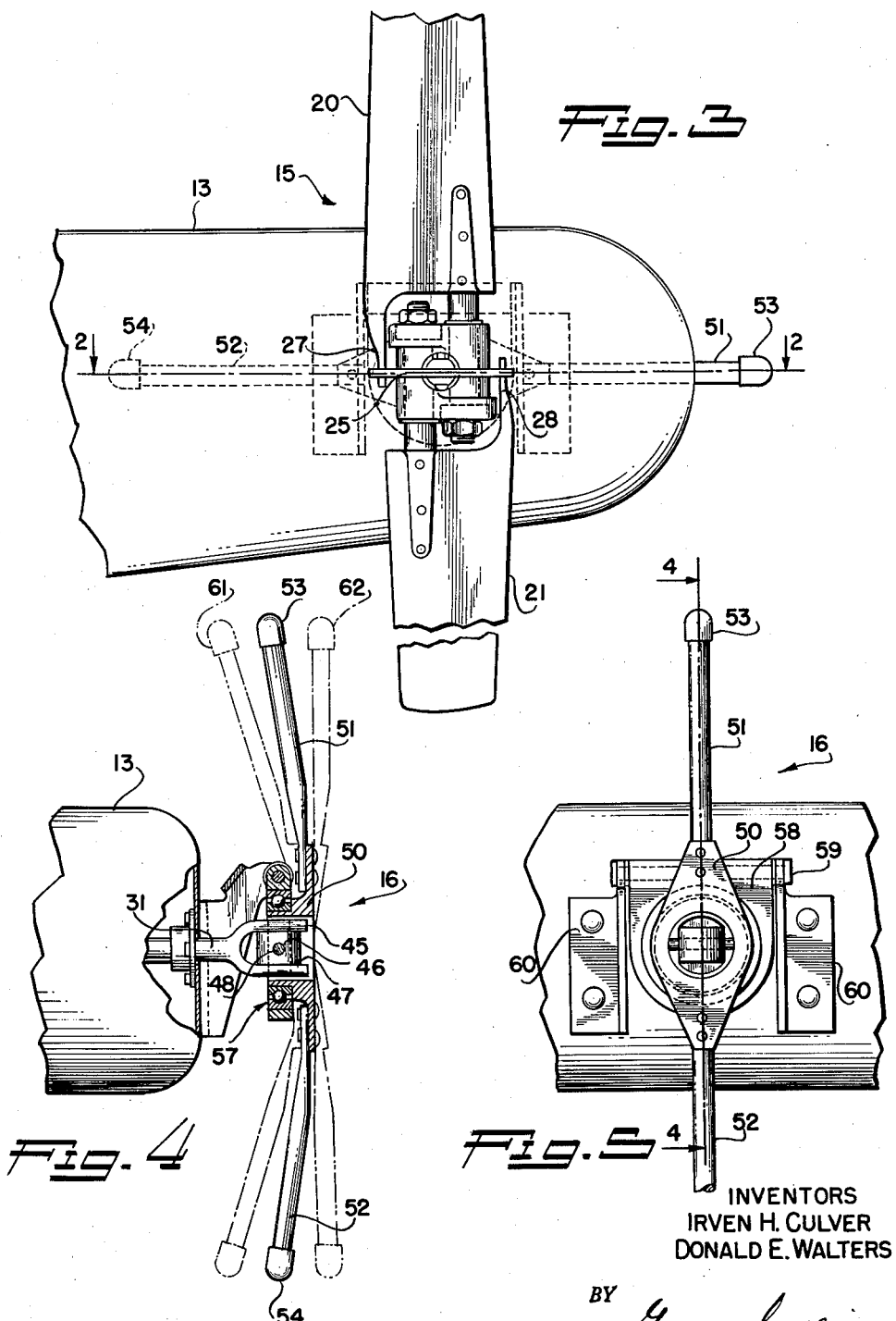

United States Patent Office 3,004,736
Patented Oct. 17, 1961

---

3,004,736
TAIL ROTOR FOR HELICOPTER
Irven H. Culver, Burbank, and Donald E. Walters, Calabasas, Calif., assignors to Lockheed Aircraft Corporation, Burbank, Calif.
Filed Oct. 6, 1959, Ser. No. 844,712
9 Claims. (Cl. 244—17.21)

This invention pertains to a tail rotor yaw control of a rotary wing or helicopter type aircraft. More particularly, it relates to a tail rotor designed to stabilize the yaw position of the helicopter on which it is mounted.

Helicopter tail rotors have been conventionally constructed with pitch control means usually attached to rudder pedals in the cockpit so that generally yaw or direction may be changed about a vertical axis through the center of gravity by a movement of the pedals which would then change the pitch of the tail rotor rotating in a vertical plane about a transverse axis to the tail of the helicopter to change its direction. Because of the nature of the helicopter, the main rotor causes devious air currents about the aircraft. The slow rate of flight of the helicopter made it susceptible to gusts which in combination with the devious air currents from the main rotor means that the angle of attack with relative moving air of the surfaces of the tail rotor was constantly varying, requiring very delicate and precise yaw control. Each time the angle of attack of the blades of the tail rotor changed, it meant that the tail rotor would thus move the tail boom of the helicopter around its vertical axis. In order to maintain unidirectional flight, the pilot had to be experienced and highly skilled. Because of these devious air currents, it would seem in many cases that cross controlling was necessary, as compared to the control movements of a conventional aircraft.

It is an object of this invention, therefore, to provide a tail rotor which will maintain stable directional control. This is accomplished by providing means which automatically respond when the boom of the helicopter moves about the vertical axis in an undesired direction to alter the pitch of the tail rotor to bring the boom back to its original position and direction.

It is a further object of this invention to provide a tail rotor which may be controlled to alter direction when necessary. Elastic control means to conventional rudder pedals are contemplated which alter the pitch of the tail rotor to move the boom of the helicopter about the vertical axis.

It is further an object of this invention to provide a tail rotor which will provide a high degree of stiffness about the vertical axis of a helicopter.

It is further another object of this invention to provide a tail rotor for a helicopter which will not require much experience and skill on the part of the driver or pilot. Simple body motions instinctive with the driver will be used to direct the helicopter.

It is further an object of this invention to provide a tail rotor for a helicopter that will not require a constant sensing of minute changes of direction and resultant correction of the part of the pilot or driver. Gyroscopic means are provided which will tend to maintain the helicopter in a single direction by altering the pitch of the tail rotor to bring it back to that single direction if devious air currents or gusts should cause it to move from its longitudinal position.

Further objects will become apparent from the reading of the following specification, especially when taken in conjunction with the drawings in which like numbers indicate like elements.

FIG. 3 is a side view of the tail rotor showing its pitch control mechanism.

FIG. 4 is a view taken on lines 4—4 of FIG. 5 showing the gyro mechanism.

FIG. 5 is a side view of the gyro mechanism.

The tail rotor, according to the present invention, contemplates the use of a gyroscopic mass rotating in a vertical plane so connected to the pitch control mechanism of the tail rotor that when the boom of the helicopter is displaced about the vertical axis, the gyroscopic mechanism will be caused to precess to cause the tail rotor to change its pitch to return to the original position.

Figure 1:
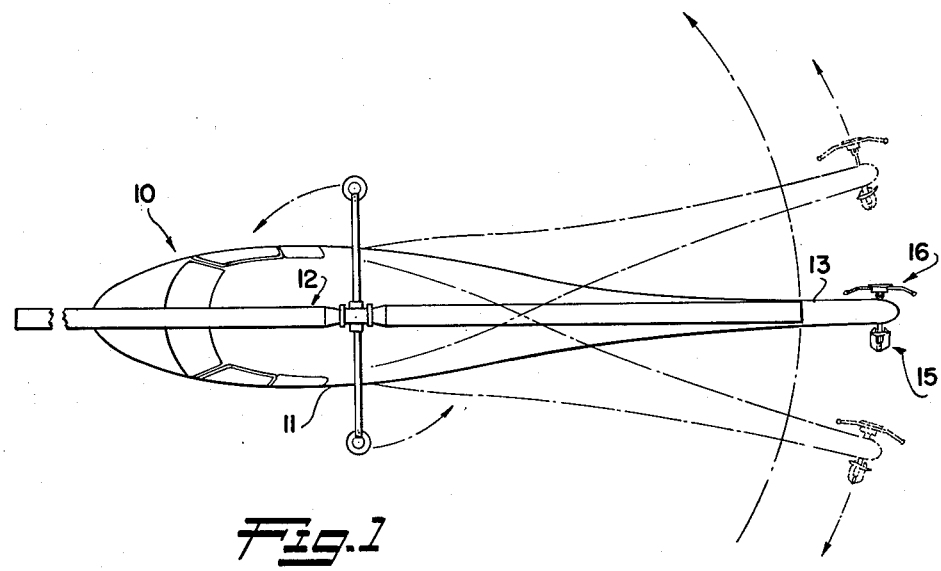
FIG. 1 is a plan view of the helicopter with the action of the tail rotor shown in dotted lines as the boom of the helicopter moves from its full line position.
Figure 2:
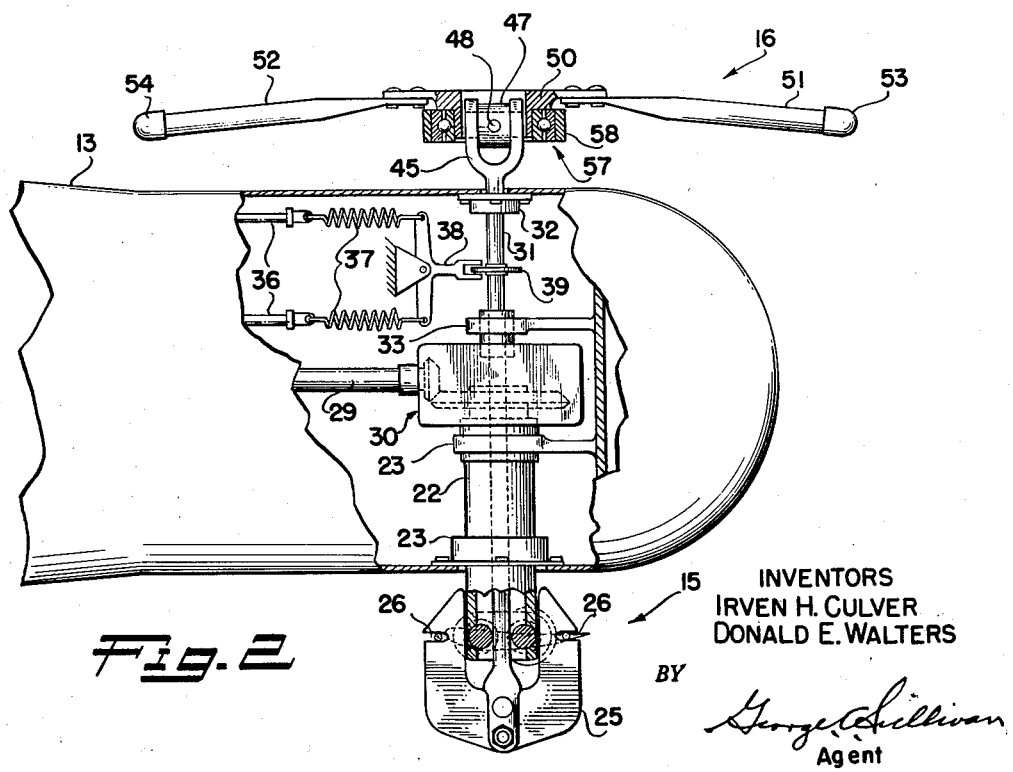
FIG. 2 shows a cross section of the tail rotor and its gyro mechanism as taken on lines 2—2 of FIG. 3.

In FIG. 1, the helicopter 10 is shown with a body 11, a main rotor 12 and a tail boom 13. On the end of the boom 13 is the variable pitched tail rotor 15 which is mounted on the same shaft as the gyroscopic mechanism 16. The rotor 15 is comprised of variable pitch blades 20 and 21 which are pivoted to the sleeve 22. Sleeve 22 rotates within the bearings 23. Uniform pitch control is affected by the plate 25 which has notches 26 into which extensions 27 and 28 from the trailing edges of blades 20 and 21 ride. Lateral movement of the plate 25 will cause an equal change in pitch in both blades 20 and 21. The plate 25 is fixed to the splined shaft 31 which slidably rotates with sleeve 22. The splined shaft 31 rotates within bearings 32 and 33 and is restricted from endwise movement. Shaft 29 from the main motive means transmits its rotary force to the differential gears in gear box 30 to drive the sleeve 22 and its splined shaft 31.

Pitch change is affected by moving the "rudder" pedals in the cockpit to which cables 36 are attached which transmit the control force through springs 37, the bell crank 38 and the plate 39 fixed to the shaft 31 to move the shaft 31 and plate 25 axially moving blade extensions 27 and 28 to collectively change pitch.

On the opposite end of the splined shaft 31 from the rotor side of the boom 13, there is a fork portion 45. Across the forked portion 45, there is a shaft 46 on which is carried a bearing 47 which in turn carries a pivot shaft 48. Gyroscopic mechanism 16 is carried on shaft 48 for universal movement by means of cage 50. Arms 51, 52, fixed to cage 50, carry weights 53 and 54 to provide the necessary mass for the gyroscopic effect. About the cage 50 is a ball bearing 57 which is mounted in pivoted member 58. Member 58 is pivoted on the horizontal shaft 59. Shaft 59 is carried by the brackets 60 fixed to the tail boom 13. The member 58 is shown pivoted on a horizontal axis in FIGS. 3, 4 and 5. The pivoted axis represented here by shaft 59 does not necessarily have to be on the horizontal but may be slanted to achieve a coupled reaction from both roll and yaw.

The shaft 29 from the main power plant driving the tail rotor and the gyroscopic mechanism through the gear box 30 causes them to rotate in two vertical planes. The rotating gyroscopic mechanism 16 will tend to maintain its position in space in its plane of rotation. Application of a force on a gyroscopic mechanism in any plane other than the rotational plane will cause it to precess. Forward motion of the helicopter will cause no precession of the gyroscopic mechanism since the plane of rotation does not change. However, if the tail boom as is viewed in FIG. 4 from the aft, is moved to the right, the gyroscopic mechanism will precess to the dotted line position 61. This causes the splined shaft 31 to move further to the right with relation to the tail boom 13. As can be seen in FIG. 3, movement of the splined shaft to the right will cause the rotor blades 20 and 21 to change their pitch so that the tail rotor will move back toward the left. In FIG. 3, this would be seen as movement of the plate 25 away from the viewer, carrying with it the extensions 27 and 28. Inadvertent movement of the boom 13 to the left will cause the gyroscopic mechanism to precess to the left to assume the dotted line position 62. Thus, the splined shaft moves to the left further than the boom which, as viewed in FIG. 3, moves the plate 25 toward the viewer, thus changing the pitch of blades 20 and 21 so that the tail boom is moved back to the right to the original position full line position of FIG. 4.

It can be seen that a very stable yaw control is maintained by utilizing the gyroscopic control mechanism in conjunction with the pitch control of the tail rotor of a helicopter according to the present invention. Changes of direction are effected through the cables 36 from the "rudder" pedals in the cockpit which forcibly changes or overrides the gyroscopic mechanism so as to pull or push the tail boom 13 to its new direction. While it has been shown with the gyroscopic mechanism 16 on the opposite end of the shaft 31 from the tail rotor 15, it will be understood that this is not necessary to practice the present invention.

A very stable tail rotor mechanism for helicopters has been shown and described. Operation of the tail rotor should require little training on the part of the person who will drive it. Its use on any helicopter will simplify the operation immeasurably.

The invention is not intended to be restricted to any particular arrangement of parts or any of the various details thereof, even where specifically shown and described as the same may be modified in various particulars or may be applied in many varied relations without departing from the spirit and scope of the claimed invention, practical constructions embodying certain details of the invention being illustrated and described but only for the purpose of complying with the requirements of the statutes for the disclosure of operative embodiments but without attempting to disclose all of the various forms and modifications in which the invention might be embodied.

Having revealed the details of my invention, we claim the following combinations of elements and their equivalents to which we wish the protection by a United States Letters Patent.

What is claimed is:

1. A tail rotor for a helicopter comprised of: collectively variable pitch rotor blades rotatable in a vertical plane about an axis transverse to the boom of said helicopter, means pivoted about a horizontal axis parallel to said boom, means responsive to displacement of said means pivoted about a horizontal axis to collectively vary the pitch of said rotor blades so as to return said rotor blades to their original plane of rotation.

2. A tail rotor for a helicopter having a tail boom comprised of: collectively variable pitch rotor blades, means to mount said rotor blades about an axis transverse to said tail boom for rotation in a vertical plane, gyroscopic means, means to mount said gyroscopic means about an axis transverse to said tail boom for rotation in a vertical plane, means responsive to axial displacement of said gyroscopic means to collectively vary the pitch of said rotor blades to cause said rotor blades to return said gyroscopic means to the plane occupied prior to displacement.

3. A tail rotor for a helicopter having a tail boom comprised of: a rotatable sleeve transverse to the boom of said helicopter, means to rotate said sleeve, a plurality of variable pitch rotor blades pivoted at their center of pressure axes to said sleeve at right angles to the axis of said sleeve, an axial splined opening in said sleeve, a splined shaft mating with said axial opening of said sleeve so as to slidably rotate therewith, means on said splined shaft to collectively change the pitch of said rotor blades responsive to its axial movement, gyroscopic means, means to universally connect said gyroscopic means to said splined shaft so as to rotate therewith and have freedom to change its plane of rotation, pivot means for said gyroscopic device transverse to said splined shaft and displaced therefrom so that a change in the plane of rotation of said gyroscopic means will cause said splined shaft to move axially to cause the pitch of said rotor blades to collectively change to move said boom to a position wherein said gyroscopic means will rotate in its original plane.

4. A tail rotor for a helicopter having a tail boom comprised of: a rotatable sleeve means transverse to said boom, means to rotate said sleeve means about its axis, an axially movable shaft extending through said sleeve means, means to cause said shaft to rotate with said sleeve means, a gyroscopic mass mounted at one end of said shaft to rotate therewith, universal means between said shaft and said gyroscopic mass which will permit said gyroscopic mass to rotate in any plane relative to said shaft, pivot means for said gyroscopic means transverse to the axis of rotation of said shaft and displaced therefrom, rotor blades pivoted to and extending perpendicularly away from said sleeve means, and means on said shaft to collectively vary the pitch of said rotor blades responsive to axial movement of said shaft.

5. A tail rotor for a helicopter having a tail boom comprised of: a sleeve rotatable on a horizontal axis transverse to said tail boom, means to rotate said sleeve, an axial bore in said sleeve, a shaft slidably mounted in said axial bore, means on said shaft and about said axial bore in said sleeve to prevent relative rotational movement between said sleeve and said shaft, rotor blades pivoted to said sleeve substantially perpendicular to its axis so that rotation of said sleeve will cause rotation of said rotor blades in a vertical plane, means on said shaft to collectively change the pitch of said rotor blades in like direction responsive to axial movement of said shaft relative to said sleeve, universal joint means on said shaft, a plurality of arms fixed to said universal joint means and extending perpendicularly away from the axis of universal joint means, masses on the extremities of said arms to present a gyroscope when rotating, bearing means surrounding said universal joint means having an inner and outer race with ball bearings therebetween, said outer race being pivoted to said tail boom at a point displaced radially from said shaft so that horizontal displacement of said tail boom and resultant precession of said masses forming said gyroscope will cause axial displacement of said shaft relative to said sleeve to collectively vary the pitch of said rotor blade in such a direction to return said boom to its position prior to displacement.

6. A tail rotor for a helicopter comprised of: collectively variable pitch rotor blades rotatable in a vertical plane about an axis transverse to the boom of said helicopter, means pivoted about a horizontal axis parallel to said boom above said axis and transverse to the boom of said helicopter which are responsive to horizontal movements of said tail boom to pivot about said horizontal axis, means responsive to pivotal displacement about said horizontal axis to collectively vary the pitch of said rotor blades so as to return said tail boom in the opposite direction to its horizontal movement.

7. A yaw control rotor for a helicopter comprised of an extremity extending horizontally from the vertical axis of said helicopter, collectively variable pitch rotor blades rotatable in a vertical plane about an axis transverse to said extremity of said helicopter, means pivoted about an axis parallel to said extremity and depending downwardly therefrom so that horizontal displacement of said extremity about said vertical axis of said helicopter will cause said means pivoted about said axis parallel to said extremity to be displaced about said axis, means responsible to displacement of said means about said axis to collectively vary the pitch of said rotor blades to cause said extremity to return to its position prior to said horizontal movement.

8. A tail rotor for a helicopter having a tail boom comprised of: a rotatable sleeve transverse to the boom of said helicopter, means to rotate said sleeve, a plurality of variable pitch rotor blades pivoted at the irlongitudinal axes to said sleeve at right angles to the axis of said sleeve, a shaft mating with said sleeve so as to slidably rotate therewith, means on said shaft to collectively change the pitch of said rotor blade responsive to its axial movement, gyroscopic means, means to universally connect said gyroscopic means to said shaft so as to rotate therewith and have freedom to change its plane of rotation, pivot means for said gyroscopic device transverse to said shaft and displaced therefrom so that a change in plane of rotation of said gyroscopic means will cause said shaft to move axially to cause the pitch of said rotor blades to collectively change to move said boom to a position whereby said gyroscopic means will rotate in its original plane.

9. A tail rotor for a helicopter having a tail boom comprised of: a collectively variable pitch rotor rotatable in a vertical plane about an axis transverse to the tail boom of said helicopter, means to rotate said rotor about its axis, gyroscopic means, means to mount said gyroscopic means for rotation about an axis transverse to said tail boom, means to permit said axis to pivot about any axis perpendicular to itself, means responsive to lateral movement of said tail boom to place a lateral input force into said gyroscopic means at a point other than at its rotative axis to cause said gyroscopic means to precess, means responsive to precession of said gyroscopic means to collectively vary the pitch of said variable pitch rotor blades so as to cause said tail boom to return to its position from which it is displaced.

References Cited in the file of this patent

UNITED STATES PATENTS

| | | |
|---|---|---|
| 1,994,488 | Sikorsky | Mar. 19, 1939 |
| 2,317,342 | Pullin | Apr. 27, 1943 |